United States Patent [19]
Lugaresi

[11] Patent Number: 5,241,172
[45] Date of Patent: Aug. 31, 1993

[54] VARIABLE PITCH POSITION ENCODER

[75] Inventor: Thomas J. Lugaresi, Campbell, Calif.

[73] Assignee: Hewlett-Packard Company, Palo Alto, Calif.

[21] Appl. No.: 787,528

[22] Filed: Nov. 4, 1991

[51] Int. Cl.$^5$ .............................................. G01D 5/38
[52] U.S. Cl. .................................. 250/231.16; 341/13
[58] Field of Search ....................... 250/231.14, 231.16, 250/208.2, 237 G; 341/13; 356/395; 324/175

[56] References Cited

U.S. PATENT DOCUMENTS

| | | | |
|---|---|---|---|
| 4,259,570 | 3/1981 | Leonard | 250/214 A |
| 4,266,125 | 5/1981 | Epstein | 250/231 SE |
| 4,423,958 | 1/1984 | Schmitt | 356/395 |
| 4,451,731 | 5/1984 | Leonard | 250/237 SE |
| 4,691,101 | 9/1987 | Leonard | 250/231 SE |
| 4,963,733 | 10/1990 | Spaulding | 250/237 G |
| 4,988,865 | 1/1991 | Schmidt et al. | 250/231.16 |

*Primary Examiner*—David C. Nelms
*Assistant Examiner*—S. Allen

[57] ABSTRACT

The invention provides an optical encoder for use with various density code wheels. The encoder provides a geometric offset for a photodetector that is fully illuminated. A circuit offset is provided for a photodetector that is not illuminated. The encoder comprises a light source; a principal photodetector; a pair of secondary photodetectors on opposite edges, respectively, of the principal photodetector; and a code wheel having plural alternating windows and spokes which respectively transmit or block light from the light source. The code wheel is mounted between the light source and the photodetector. The principal photodetector has a unit width and a first length. The secondary photodetectors each have a half-unit width and a second length; the second length is less than the first length. The encoder also includes a circuit biased for producing one logic level when all photodetectors are illuminated and producing the opposite logic level when only the secondary photodetectors are illuminated or when no photodetectors are illuminated.

12 Claims, 4 Drawing Sheets

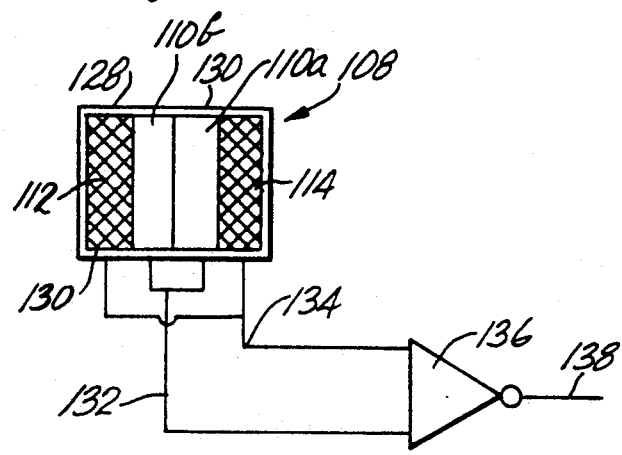
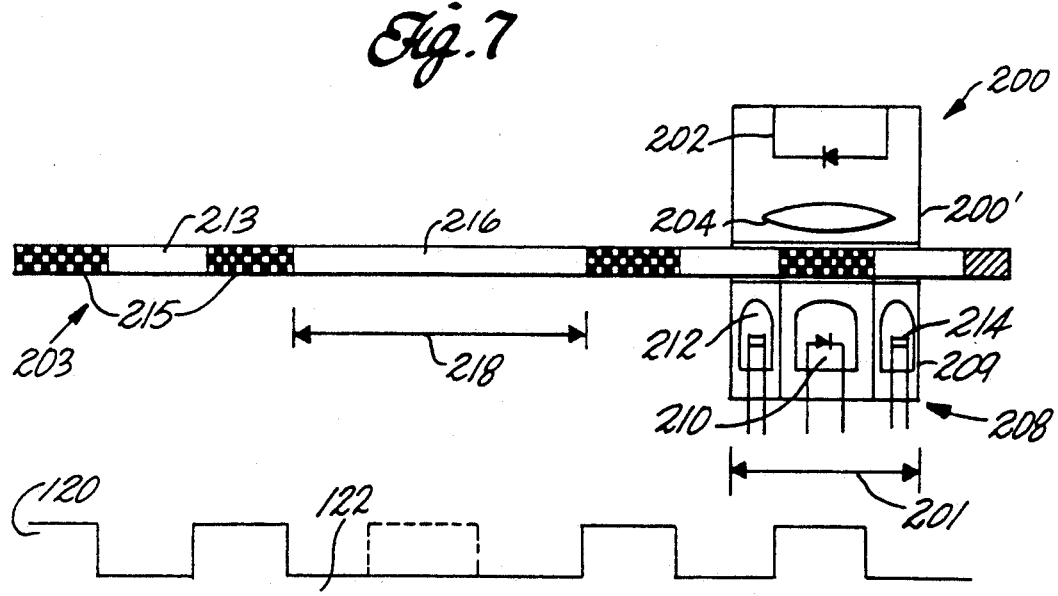

VARIABLE PITCH POSITION ENCODER

FIELD OF THE INVENTION

This invention generally relates to position sensors or encoders such as optical shaft angle encoders which produce discrete electrical signals indicative of the angular position of a shaft. In particular, the present invention improves generation of a position pulse for a shaft encoder or a slot interrupter.

BACKGROUND OF THE INVENTION

Incremental optical motion encoders are used to resolve the position and movement of an object along a particular route. Such encoders generally include a light source for emitting a light beam, light modulation means for modulating the light beam in response to movement of the object along the route, and detection means for receiving modulated light and for producing discrete electrical signals representing detection of light by the detectors. As the light is modulated in response to the movement of the object, the stream of electrical signals from the detector assembly produces a continuous wave form usually resembling a square wave. The position of the object along its route determines the position of each signal in the wave form. The phase of the wave form differs depending upon the location of the object. Thus, signals from the detectors can be used to indicate a change in location of the object along the route. Two or more out-of-phase signals from separate detectors can be used to detect both change in location and change of direction of movement.

For an incremental motion encoder to indicate the absolute position or location of the object along its route, an index pulse is generated at least once along the route. The incremental signals can be used to count incremental movement from the index pulse. If the position of the object is known at the time the index pulse is generated, the absolute position of the object at any place along the route can be determined.

Therefore, to provide an indication of absolute position, change in location and direction of movement, an incremental encoder usually requires three channels of information. Two channels are derived from two or more out of phase encoder signals that are produced throughout the route of the object, and a third is an index signal produced at least once along the route at a known position of the object.

Such a position encoder or a movement detector is used to measure the angular position of a shaft. Depending on the use of such a shaft angle encoder, a high degree of resolution and accuracy may be needed; for example, an automotive crankshaft angle measurement applications or accelerator speed control, a resolution of 2000 increments per revolution of the shaft may be necessary. Accuracy of the correlation between the signal from the encoder and the actual mechanical position of the shaft is also important. Mechanical alignment discrepancies can adversely affect accuracy as can electrical noise, due to the very small dimensions of the code wheel, the transmissive sections and the nontransmissive sections.

To accurately detect the index pulse, a push-pull electronic arrangement may be used to determine the location of the index pulse. In such an arrangement, two photodetectors are arranged laterally adjacent one another in alignment with a light source; a circular code wheel fixed to the shaft separates the light source and the detectors. When one of the detectors is illuminated, a logic signal of one sense, such as a "1", is produced. When a spoke on the code wheel occults the illumination, the opposite logic signal is produced, such as a logical "0." Then as the index window passes over the detectors, one detector will generate a logic 1 of long duration, followed an instant later by a logic 1 from the second detector. The direction of travel of the code wheel may be determined by sensing which detector is first to generate a long duration of logic 1.

An optical encoder that produces an index pulse having the same logic value regardless of the direction of rotation of the code wheel has three photodetectors arranged laterally adjacent one another in alignment with the light source. The principal photodetector has a unit width; the two secondary photodetectors each have a one-half unit width. The secondary photodetectors are preferably arranged to be occulted by a spoke or adjacent spokes of the code wheel when the principal photodetector is illuminated by the light source. The principal photodetector is preferably mounted between the second and third photodetectors. Alternatively, the two secondary photodetectors can be mounted on one side of the principal photodetector. Each photodetector can produce a logic level in response to the detection of light or the absence of light.

The code member has a code wheel with a circumferential track comprising a plurality of alternating windows and spokes for alternately transmitting or blocking the light upon movement of the code wheel. Each window and each spoke has a unit width. The encoder preferably includes a circuit for processing the photodetector output signals. The circuit comprises a buffer circuit for processing the output signals, having a first input connected to the output of the two secondary photodetectors, and a second input connected to the output of the principal photodetector.

A desirable feature of the optical encoder is the capability of using code wheels of differing density with a particular photodetector. The density of a code wheel is defined by the size of the principal photodetector relative to the size of the window or spoke of the code wheel. For example, a code wheel of equal density to that of the photodetector has a window and spoke each with a width equal to the width of the principal photodetector. Similarly a half density code wheel has a window and spoke each with a width that is twice the width of the principal photodetector.

A half density code wheel also functions as a slot interrupter because a window allows the light source to totally illuminate both the principal and secondary photodetectors, and a spoke completely occults both the principal and secondary photodetectors. However, for the previously described embodiment, the photodetector can produce an ambiguous output signal when both the principal and secondary photodetectors are either entirely illuminated or entirely occulted.

Thus it is desirable to provide an optical encoder apparatus which produces an unambiguous output signal for code wheels having equal or lesser density than that of the photodetectors. Preferably this is provided by modifying the photodetector rather than changing external hardware.

SUMMARY OF THE INVENTION

These and other features and advantages, which will become apparent from the detailed description of the preferred embodiments below, are achieved by providing an encoder for digitally representing the spatial position of a rotatable shaft. The encoder may comprise, for example, the combination of illumination means for radiating light, a principal photodetector, a pair of secondary photodetectors along opposite edges respectively of a principal photodetector. Light interruption means are provided between the illumination means and the photodetectors for selectively illuminating and not illuminating the photodetectors. A circuit connected to the photodetectors is biased for producing one state of signal when all of the photodetectors are illuminated and producing the opposite state of signal when only the secondary photodetectors are illuminated or when no photodetectors are illuminated. The principal photodetector has a unit width; each secondary photodetector is one half as wide as the first photodetector. The principal photodetector has an area greater than the combined areas of the secondary photodetectors.

In an exemplary embodiment, the light interruption means comprises a movable code member mounted between the illumination source and the photodetectors for alternately transmitting or blocking the illumination source upon movement. Preferably the code member includes an index window for indexing the code member. Each photodetector can produce an output signal in response to detection of light or the absence of light. The illumination means is a light emitting diode.

In an exemplary embodiment the code member comprises a code wheel with a circumferential track comprising a plurality of alternating windows and spokes for alternately transmitting or blocking the illumination means upon movement of the code wheel. Each window and each spoke has a width at least as wide as a unit width. The encoder includes the circuit for processing the photodetector output signals. The circuit is biased so that the same logic signal is generated when the photodetectors are not illuminated or when only the secondary photodetectors are illuminated.

Use of the invention eliminates the need to incorporate, in an end-user product, additional circuitry to sense the direction of the code wheel and to invert the logic level of the index pulse depending on the direction of rotation of the code wheel. Furthermore, the invention allows the use of code wheels having a density no greater than that of the photodetectors. This eliminates the ambiguity caused when all of the photodetectors are completely illuminated or completely occulted. This results in a simplified product which can be manufactured at lower cost. Applications for this technique include automotive equipment location sensing, photocopiers and other light industrial equipment.

BRIEF DESCRIPTION OF THE DRAWINGS

The foregoing features of the present invention will be better understood upon consideration of the following detailed description of certain preferred embodiments taken in conjunction with the accompanying drawings in which:

FIG. 6 is a plan view of one embodiment of the prior art detector of FIG. 5;

FIG. 7 is a side elevation of the apparatus of the present invention for an equal density code wheel and a corresponding output wave form;

DETAILED DESCRIPTION OF THE PREFERRED EMBODIMENTS

An optical encoder useful to understand the present invention is described in U.S. patent application Ser. No. 07/686,677 (Machida), filed Apr. 17, 1991, assigned to the same assignee as this invention, the subject matter of which is hereby incorporated by reference. Other shaft angle encoders are described, for example, in U.S. Pat. Nos. 4,259,570, 4,266,125, 4,451,731, and 4,691,101. FIGS. 1-6 herein relate most particularly to the Machida application and the subject matter therein. FIG. 5 is representative of the prior art as disclosed in the Machida application.

The prior art illustrated in FIGS. 1-6, an encoder module 1 provides a collimated light beam and has light detectors 7 to receive the light beam after modulation by a code wheel 3. (The reference numbers of the Machida application are used herein to describe the prior art) A light emitting diode (LED) 9 provides light having a preferred wave length of approximately 700 nanometers; however, any frequency of electromagnetic radiation having a wave length substantially shorter than the relevant dimensions of the encoder may be utilized. For example, infrared light is commonly used. An emitter lens is positioned to transmit the light from the LED 9.

Figure 1:
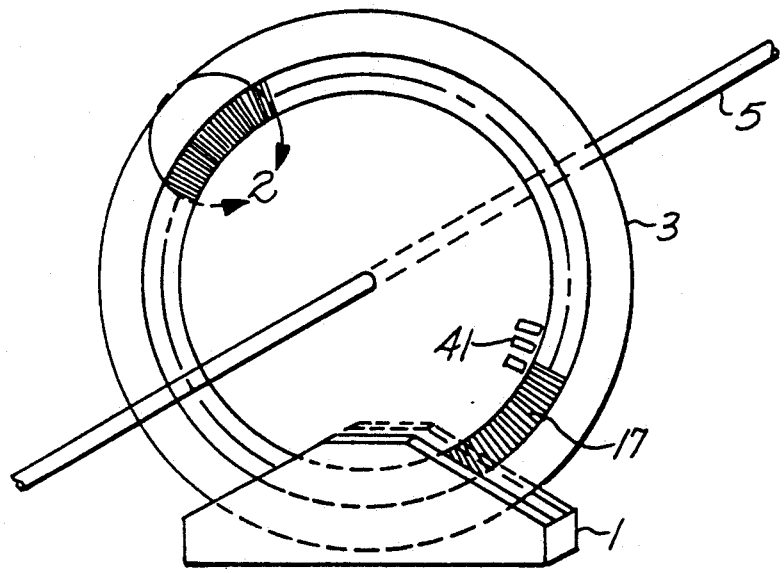
FIG. 1 is a front perspective view of an exemplary prior art code wheel assembly.
Figure 2:
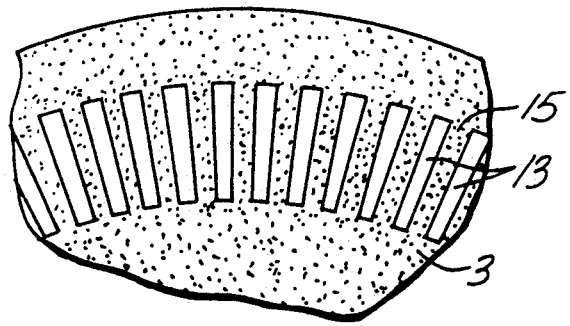
FIG. 2 is a partial view of the face of the code wheel of FIG. 1.
Figure 3:
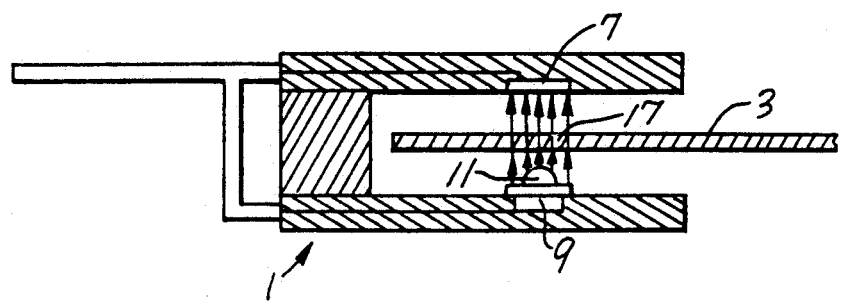
FIG. 3 is a partial section view of the light source and receptor apparatus of FIG. 1.

The code wheel 3 of FIG. 2 is concentrically mounted on a shaft 5 to rotate with the shaft and modulate the light beam with an optical track 17. The track 17 has alternating light-transmissive sections or windows 13 and non-light-transmissive sections or spokes 15 of a unit width equal to the width of a window. One transmissive section and one non-transmissive section make up one pitch of the code wheel. As the wheel rotates, the alternating sections 13, 15 block or transmit light from the LED, thereby illuminating or blocking light passing to the photodetectors.

The code wheel has a data track containing 500 transmissive sections and an equal number of nontransmissive sections. These sections are trapezoidal since they are located immediately adjacent to one another. An exemplary nominal width of each transmissive section is 62 microns, and a radial length of each section is 750 microns. The code wheel is preferably made of a durable, optically opaque material, such as stainless steel, and has a diameter of approximately 22 millimeters. Transmissive sections may comprise holes masked and etched through the disk.

Figure 4:
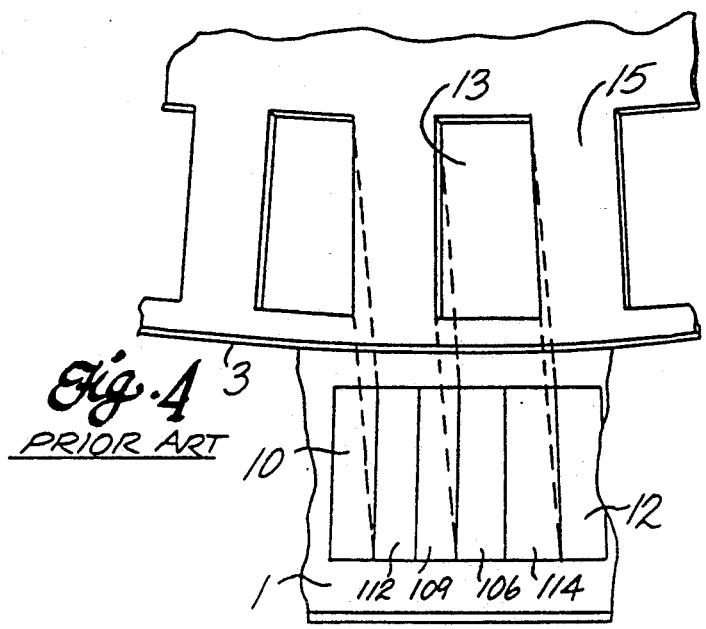
FIG. 4 is an enlarged partial view of the code wheel and receptor apparatus of FIG. 1.
Figure 5:
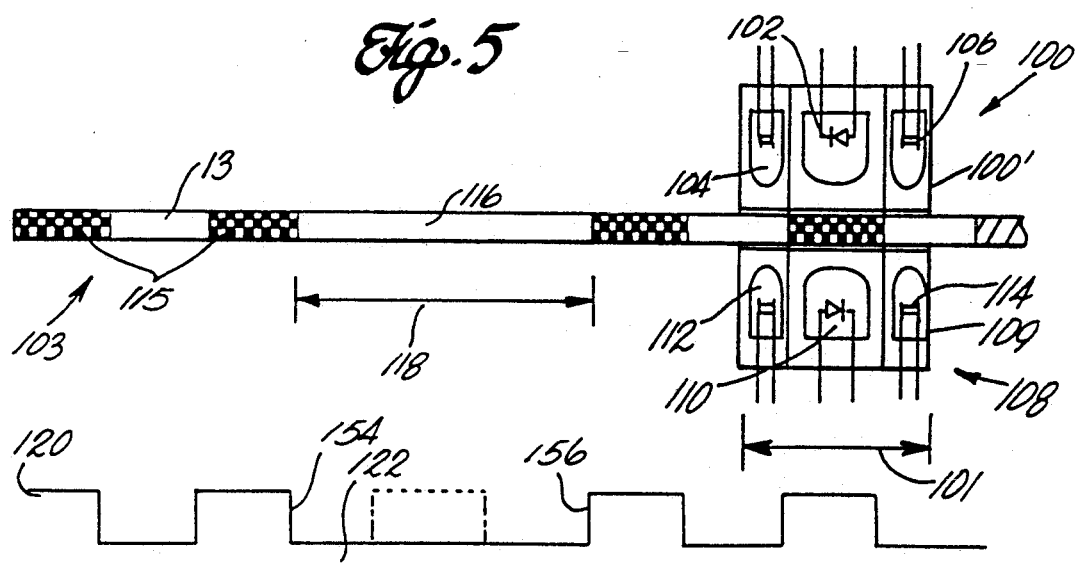
FIG. 5 is a side elevation of the apparatus of a prior art code wheel and detector assembly and a corresponding output wave form.

As illustrated in machida and reproduced herein in FIG. 4, several groups of four light detectors 110a, 110b, 112, 114 are provided. A group of four light detectors has approximately the same size and shape as one transmissive section and one non-transmissive section on the code wheel. Individual detectors 110a, 110b, 112, 114 have a trapezoidal shape with an exemplary maximum width of 48 microns, a minimum width of approximately 45 microns with a gap of about 8 microns between the individual light detectors. The light detectors preferably comprise photodiodes fabricated on a semiconductor chip using standard bipolar semiconductor technology. As illustrated in FIG. 4, a group of light detectors are placed in a one-dimensional array as close to one another as the bipolar semiconductor technology will allow. Dummy photodiodes 10 and 12 are located on each side of the array to minimize the effect of stray light on the functioning light detectors 110a, 110b, 112, 114. In a shaft angle encoder, the photodiodes are arranged in an arc having the same radius as the code track on the code wheel.

As indicated in FIG. 5 the encoder comprises a code wheel 103 and an LED assembly or illumination means 100 in a photodetector assembly or photodetector means 108.

The code wheel 3 includes an index window 116 formed by removing a spoke 115 from wheel 103, resulting in creation of a window 116 having a length 118 of three units.

The LED assembly 100 is preferably mounted in a single housing 100' having a length 101 of two units, that is, less than the length 118. The LED assembly includes a first LED 102, a second LED 104, and third LED 106, although a single LED having a collimating lens may be used. A collimating lens is used to insure that light is directed straight at the photodetector assembly 108.

The photodetector assembly 108 similarly is preferably encapsulated in a single housing 109 having a 2-unit length 101. The housing may comprise a single integrated circuit. The photodetector assembly includes a first photodetector 110, a second photodetector 112, and a third photodetector 114. The first photodetector 110 has a unit width and is located between the two other photodetectors 112 and 114, which are each fabricated with the one-half unit width. Thus, the combined width of the three photodetectors is two units. The length 118 of the index window is 1.5 times the length of the LED and photodetector assemblies.

As indicated in FIG. 6, the photodetector assembly may be constructed in the form of a single integrated circuit having a flat, generally rectangular body 128 divided into four separate photodetectors 110a, 110b, 112, 114, each having a half-unit width. To enable the four photodetectors to operate as three photodetectors, the center photodetectors 110a and 110b are wired together to produce a single output line 132. Thus, these two center photodetectors 110a, 110b form a unit width center photodetector panel. Photodetectors 112, 114 are each a half-unit wide. The outer pair of photodetectors are also connected together by a single output line 134. The output lines 132, 134 from the photodetectors are connected to a buffer circuit 136 in a known manner which produces a single output on line 138.

Attention is invited to FIG. 5 which illustrates the wave form output of the photodetector assembly 108 of FIG. 6. This wave form 120 includes a low level index pulse 122 separated from the trailing edge 154 and the leading edge 156 of the adjacent pulses by approximately three times the unit pulse width. The output 138 from buffer 136 is obtained by summing the outputs from detectors 112, 114 and comparing it to the sum of the outputs of detectors 110a and 110b. The relevant logic equations are that the output 138 is equal to a logic 1 if the sum of the output of photodetectors 112, 114 is greater than the sum of the outputs from photodetectors 110a, 110b. Conversely, the output 138 is a logic 0 if the sum of the outputs of photodetectors 110a, 110b is greater than the sum of the outputs of the photodetectors 112, 114.

However, an ambiguous state results if a code wheel of half density is used. For example, if all four photodetectors are illuminated, then each produces an identical output. The sum of the output of the photodetectors 112 and 114 equals the sum of the outputs of photodetectors 110a and 110b. Thus, under the logic equations, the output 138 is indeterminate. Similarly, he output of photodetectors 112, 114 equals the sum of the output of photodetectors 110a, 110b. Output 138 is again in an indeterminate state.

This indeterminate state of the logic equations of the circuit of the prior art is a specific problem addressed by this invention. To produce an unambiguous output for photodetectors in half density code wheel systems, the apparatus of FIG. 7 is used, comprising a code wheel 203, an LED assembly or illumination means 200 and a photodetector assembly or photodetector means 208.

The code wheel 203 includes an index window 216 formed by removing a spoke 215 from wheel 203, resulting in creation of a window 216, having a length 218 of three units.

The LED assembly 200 is preferably mounted in a single housing 200', having a length 201 of two units, that is, less then the length 218. The LED assembly includes an LED 202, and a collimating lens 204. A collimating lens is used to insure that light is directed straight at the photodetector assembly 208. Alternatively three LEDs, one opposite each photodetector may be used.

The photodetector assembly 208 is preferably encapsulated in a single housing 209 in a manner similar to the prior art. The housing preferably has a two unit length 201. Furthermore, the housing may comprise a single integrated circuit. The photodetector assembly includes a principal photodetector 210 and two secondary photodetectors 212 and 214. The principal photodetector 210 has a unit width; the secondary photodetectors have a half unit width. Thus, the combined width of the three photodetectors is two units. The principal photodetector has a first length and is located between the two secondary photodetectors 212 and 214. The principal photodetector has a first length; the secondary photodetectors have a second length, the second length being less than the first length.

Figure 8:
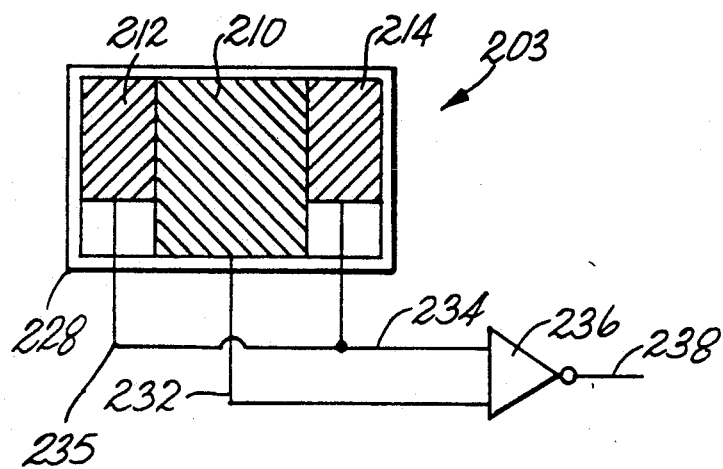
FIG. 8 is a plan view of an embodiment of the detector of FIG. 7.

As indicated in FIG. 8, the photodetector assembly may be constructed in a form similar to that of the prior art as shown in FIG. 6. In this embodiment the photodetector assembly may be constructed in the form of the single integrated circuit, having a flat generally rectangular body 228 divided into three separate photodetectors 210, 212, 214. Alternatively, the principal photodetector can be made from two photodetectors, both identical and having a half-unit width and a first length. By wiring the two photodetectors together, they form a principal photodetector panel. The principal photodetector 210 is one unit wide. The secondary photodetectors 212, 214 are each a half-unit wide. The outer pair of photodetectors are also connected together by a single output line 234. The principal photodetector has an output line 232. The output lines 232, 234 from the photodetectors are connected to a buffer circuit 236 in a known manner which produces a single output on line 238.

The output from a photodetector is a function of the illuminated area of the photodetector. Because the principal photodetector has an area larger than the combined area of the secondary photodetectors, the output signal 232 from the principal photodetector will be greater than the output signal 234 from the secondary photodetectors when all of the photodetectors are illuminated. Preferably the area of the principal photodetector is 4 to 20% larger than the combined area of the pair of secondary photodetectors. For a 16% larger area, the principal photodetector typically has an output current of 1.2 microamps for typical photodetector geometries. Similarly the secondary photodetectors each produce an output signal of 0.5 microamps. Therefore, for a totally illuminated condition, the principal output signal 232 of 1.2 microamps is greater than the secondary output signal 234 of 1.0 microamps. Hence in an all light condition the principal photodetector 210 is favored.

In order to favor the secondary photodetectors in an all dark condition, secondary output signal 234 is biased by bias circuit 235 which produces a current offset of 0.1 microamps. The means for producing this bias current is well-known to those skilled in the art. This current offset will be present regardless of the state of illumination of the secondary photodetectors. Thus, in order to have the circuit favor the principal photodetector during an all light condition, the current offset of the secondary photodetectors must be less than the geometric offset of the principal photodetector. For the preferred embodiment the current offset is 0.1 microamps; the geometric offset is 0.2 microamps.

The logic equations for this embodiment are similar to the logic equations for the prior art of FIG. 6. In particular the sum of the outputs from the secondary photodetectors is compared to the output from the principal photodetector. As with the prior art, the output 238 is a logic zero when the output from the principal photodetector is greater than the sum of the outputs from the principal photodetector. Conversely, when the sum of the outputs from the secondary photodetectors is greater than the output from the principal photodetector, the output 238 is a logic one. However, unlike the prior art, this photodetector does not have an ambiguous state when all photodetectors are illuminated or occurs.

For example, when all photodetectors are illuminated, the principal photodetector produces a greater current then the sum of the secondary photodetectors because of the geometric offset created by the larger area of the principal photodetector. For the preferred embodiment, the principal photodetector produces an output signal having a 1.2 microamp current. Similarly, the secondary photodetectors and the bias circuit have an output current totalling microamps. Therefore, in an all light condition, because the output from the principal photodetector 210 is greater than the sum of the outputs from the secondary photodetectors 212, 214, the output 238 will be a logic zero.

Conversely, for a total occultation of the photodetector assembly, the output current from the principal photodetector is 50.5 nanoamps. The output from the secondary photodetectors and the bias circuit is 150 nanoamps. Because the output from the secondary photodetectors and the bias circuit is greater than the output from the principal photodetectors, output 238 is a logic one. Thus, in this invention, there is no ambiguous output for all light or all dark illumination conditions.

The photodetector functions as an edge detector. As the spoke moves across the photodetectors, the principal and secondary outputs change as the amount of illumination changes. When the principal output signal changes from being less than the secondary output signal to being greater than the secondary output signal or vice versa, the logic value of the output 238 correspondingly changes value. Because the edge of the window or spoke creates the change in illumination of the photodetectors, the switch of logic state of output 238 occurs when the edge is at a defined location. The invention causes the switch in logic states to properly occur because the ambiguity in the logic equations has been resolved.

Figure 9:
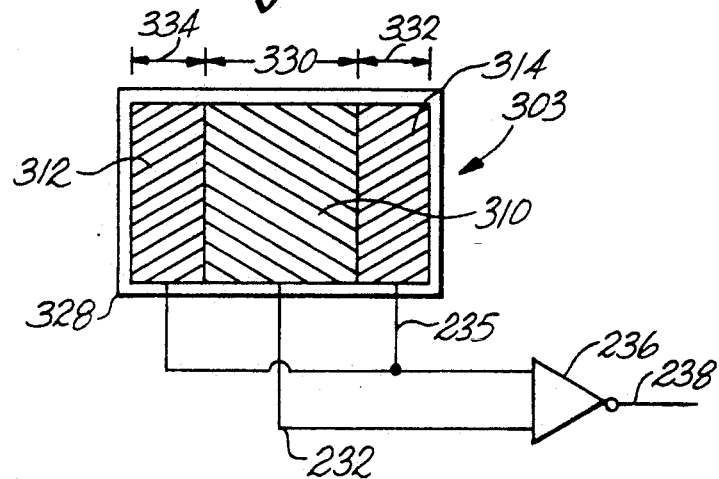
FIG. 9 is a plan view of a second embodiment of the detector of FIG. 7.

FIG. 9 shows an alternative embodiment of the present invention. In this embodiment, the photodetector assembly 303 may be constructed in the form of the single integrated circuit, having a flat generally rectangular body 328 divided into three separate photodetectors 310, 312, 314. The principal photodetector 310 and the secondary photodetector 312, 314 have a unit length. The principal photodetector has a width 330, the secondary photodetector 312 has a width 334, the other secondary photodetector 314 has a width 332. The width 330 is greater than the sum of the widths 332, 334. In a preferred embodiment, the width 332 is equal to the width 334.

For the embodiment discussed above for FIG. 8, the principal photodetector has an area larger than the combined area of the secondary photodetectors. In this embodiment because the length of the principal and secondary photodetectors are equal, the widths are adjusted to provide a geometric offset as discussed above for the embodiment of FIG. 8. Furthermore, the circuitry and the combining of output signals from the photodetectors in this embodiment is identical to that disclosed for the embodiment shown in FIG. 8.

The area of the principal photodetector is greater than the area of the secondary photodetectors and, thus, the principal photodetector will produce a greater output current than the secondary photodetectors, when the photodetectors are fully illuminated. A larger effective area for the principal photodetector can be achieved by means other than physical area. For example, for a three LED illumination system, the LED opposite the principal photodetector 110, can be brighter than the sum of the outputs of LEDs 204, 206 opposite the secondary photodetector, so that in a fully illuminated condition, the output current from the principal photodetector is greater than the output from the secondary photodetectors. Alternatively, a mask can be placed over the secondary photodetectors to filter some of the light from the LED.

In prior art optical encoders that use an index window that produces as a fully illuminated condition, these encoders have an ambiguous state when the photodetectors are fully illuminated. This invention resolves this ambiguity because the index window functions similarly to a lower density code wheel.

In the foregoing discussion, certain specific technical terms are used for the sake of clarity. However, the invention should not be limited to the specific terms so selected. For example, throughout this application and in the claims, the code wheel is referred to as being located "between" the light source and the photodetectors. However, the term "between" also extends to an arrangement in which both the light source and the photodetectors are located on the same side of the code wheel. In such an arrangement, the code wheel may comprise a solid disk having plural reflective regions, serving as "windows," interleaved with opaque, nonreflected "spokes," so that light from the light source reflects off the reflective windows and into the photodetectors. Additionally, the three unit wide window discussed herein is functionally the same as a missing spoke.

What is claimed:

1. An optical encoder for sensing rotational movement of a shaft on which a codewheel having a circumferentially positioned data track is mounted, the data track having alternating windows of any width and spokes of at least unit width, such sensing occurring by detection of individual windows and spokes during rotation, the encoder comprising:
    a light source positioned to emit light through the data track such that light is transmitted through windows and blocked by spokes during rotational movement of the shaft;
    a principal photodetector, positioned to receive light through the data track, for generating a signal in proportion to the received light, the principal photodetector having two lengthwise opposing edges and a width that is defined as the unit width;
    a first side photodetector, abutting one opposing edge of the principal photodetector, positioned to receive light through the data track, the first side photodector having a width;
    a second side photodetector, abutting the other opposing edge of the principal photodetector, positioned to receive light through the data track, for generating a signal in proportion to the received light, the second side photodector having a width;
    a detection circuit, connected to the principal, first side and second side photodetectors, operative for comparing the principal photodetector signal to a sum of the first and second side photodetector signals and for outputting a first logic state when the principal photodetector signal is greater than the sum of the first and second side photodetector signals, the detection circuit being further operative for outputting a second logic state when the principal photodetector signal is less than the sum of the first and second side photodetector signals;
    wherein the first and second side photodetectors are electrically biased and the sum of the first and second side photodetector signals indicates more received light than that received by the principal photodetector when none of the principal, first and second side photodetectors are exposed to light;
    wherein the sum of the first and second side photodetector signals indicates less received light than that received by the principal photodetector when all of the principal first and second side photodetectors are exposed to light; and
    such that the optical encoder senses rotational movement by detecting individual windows and spokes, the first logic state indicates light transmitted through the individual windows and the second logic state indicates light blocked by the spokes.

2. An optical encoder as recited in claim 1, wherein a sum of the first and the second side photodetector widths is less than the unit width.

3. An optical encoder as recited in claim 2, wherein the first and second side photodetector widths are equal.

4. An optical encoder as recited in claim 1, wherein the windows have a length of at least $L_p$, the length of the principal photodetector, and wherein:
    the first side photodetector has a length less than $L_p$;
    the second side photodetector has a length less than $L_p$; and
    wherein a sum of the first and the second side photodetector widths is equal to or greater than the unit width.

5. An optical encoder as recited in claim 4, wherein a sum of the first and second side photodetector widths are equal.

6. An optical encoder as recited in claim 4, wherein a mask is positioned between the data track and the first and second side photodetectors, the mask being operative for filtering the received light such that the sum of the first and second side photodetector signals indicates less received light than that received by the principal photodetector when all of the principal, first and second side photodetectors are exposed to light.

7. An optical encoder for sensing linear movement along a data track, the data track having alternating windows of any width and spokes of at least unit width, such sensing occurring by detection of individual windows and spokes during rotation, the encoder comprising:
    a light source positioned to emit light through the data track, such that light is successively transmitted through windows and blocked by spokes during linear movement along the data track;
    a principal photodetector, positioned to receive light through the data track, for generating a signal in proportion to the received light, the principal photodetector having two lengthwise opposing edges and a width that is defined as the unit width;
    a first side photodetector, abutting one opposing edge of the principal photodetector, positioned to receive light through the data track, for generating a signal in proportion to the received light, the first side photodetector having a width;
    a second side photodetector, abutting the other opposing edge of the principal; photodetector, positioned to receive light through the data track, for generating a signal in proportion to the received light, the second side photodetector having a width;
    a detection circuit, connected to the principal, first and second side photodectors, operative for comparing the principal photodector signal to a sum of the first and second side photodetector signals and for outputting a first logic state when the principal photodetector signal is greater than the sum of the first and second side photodetector signals, the detection circuit being further operative for outputting a second logic state when the principal photodetector signal is less than the sum of the first and second side photodetector signals;
    wherein the first and second side photodetectors are biased, the sum of the first and second side photodetector signals indicates more received light than that received by the principal photodetector when none of the principal, first and second side photodetectors are exposed to light;
    wherein the sum of the first and second side photodetector signals indicates less received light than that received by the principal photodetector when all of the principal, first and second side photodetectors are exposed to light; and such that the optical encoder senses a linear movement by detecting individual windows and spokes, a first logic state indicates light transmitted through the windows and the second logic state indicates light blocked by the spokes.

8. An optical encoder as recited in claim 7, wherein a sum of the first and the second side photodetector widths is less than the unit width.

9. An optical encoder as recited in claim 8, wherein the first and second side photodetector widths are equal.

10. An optical encoder as recited in claim 7, wherein the windows having a length of at least $L_p$, the length of the principal photodetector, and wherein:

the first side photodetector has a length less than $L_p$;

the second side photodetector has a length less than $L_p$; and wherein a sum of the first and the second side photodetector widths is equal to or greater than the unit width.

11. An optical encoder as recited in claim 10, wherein a sum of the first and second side photodetector widths are equal.

12. An optical encoder as recited in claim 10, wherein a mask is positioned between the data track and the first and second side photodetectors, the mask being operative for filtering the received light such that the sum of the first and second side photodetector signals indicate less received light than that received by the principal photodetector when all of the principal, first and second side photodetectors are lit.

* * * * *